UNITED STATES PATENT OFFICE.

WILLIAM B. CHISOLM, OF CHARLESTON, SOUTH CAROLINA.

METHOD OF MAKING INSECTICIDE-FERTILIZER.

No. 839,112. Specification of Letters Patent. Patented Dec. 25, 1906.

Application filed June 4, 1906. Serial No. 320,164.

*To all whom it may concern:*

Be it known that I, WILLIAM B. CHISOLM, a citizen of the United States, residing in the city and county of Charleston, State of South Carolina, have invented certain new and useful Improvements in Methods of Making Fertilizer Material; and I do hereby declare the following to be a full, clear, and exact description of the invention, such as will enable others skilled in the art to which it appertains to make and use the same.

In an application for Letters Patent of the United States filed by me under date of September 19, 1904, Serial No. 225,102, I have described the production of a combined fertilizer and germicide made up by grinding together sulfur and phosphatic material and finally regrinding the resulting ground mixture with nitrogenous material and potash.

I have now discovered that the process may be quickened materially by submitting the preliminary ground mixture of sulfur and phosphatic material to the action of a steam-bath immediately before mixing the ammonia (or other nitrogenous material) and the potash therewith and regrinding the final mixture in this condition.

In carrying out my invention I first pass the phosphatic material—for instance, phosphate-rock—and the sulfur, which may be ordinary lump-sulfur, (seconds,) through a preliminary crusher, reducing them to the average size of a pea or bean. The crushed rough mixture is then admitted into a pulverizing-mill of the Lucop or other suitable type and is reduced therein to an impalpable powder, any tailings being returned to the mill for further grinding. The resultant product is an intimate and uniform mixture of phosphate-rock and sulfur in the form of an impalpable powder and in a dry condition. I find that the proportion of sulfur (by weight) to give effective results may in some instances be as low as forty pounds to the ton of the mixture—*i. e.*, forty pounds of sulfur to nineteen hundred and sixty pounds of phosphate-rock—and in other instances from sixty to one hundred pounds of sulfur to the ton of mixture; but I do not desire to limit myself to these exact proportions, as it is obvious that they may be varied to a greater or less degree without departing from the spirit of my invention. The mixture is homogeneous in the sense that the grinding operation has so intimately admixed its particles and brought them to such a fineness and equality of size that they are evenly distributed throughout the mass and incapable of segregation. I now subject this finely-ground mixture to the action of a steam-bath, thereby raising its temperature to a degree approximating that of live steam of, say, thirty pounds pressure. I continue the action of the steam-bath for a period of about two minutes, and I thereupon immediately add to the heated mixture the remaining nitrogenous and potash ingredients and regrind the mixture thus constituted in a Lucop or like suitable grinding-mill, as before.

In practice I have found that a suitable fertilizer for potatoes may be compounded from eight hundred pounds of the ground mixture of phosphate-rock and sulfur ground together with six hundred pounds of cotton-seed meal, four hundred pounds of kainit, and two hundred pounds of commercial nitrate of soda, the cotton-seed meal furnishing about eight per cent. of ammonia, the commercial nitrate of soda furnishing about nineteen per cent. of ammonia, and the kainit furnishing about twelve per cent. of potash. For wheat the relative proportion of desirable ingredients would be, say, eight hundred pounds of the ground mixture of phosphate-rock and sulfur ground together with eight hundred pounds of cotton-seed meal and four hundred pounds of kainit. For cotton the relative proportion of desirable ingredients would be, say, eight hundred pounds of the ground mixture of phosphate-rock and sulfur, six hundred pounds of cotton-seed meal, four hundred pounds of kainit, and two hundred pounds of commercial sulfate of magnesia. I give these individual instances as generally typical of appropriate mixtures adapted for use for the particular crops specified.

Having thus described my invention, what I claim is—

The method of producing a combined fertilizer and germicide, which consists in grinding together sulfur and phosphatic material, subjecting the ground mixture to the action of a steam-bath, then incorporating with it an ingredient containing ammonia and an ingredient containing potash, and grinding the whole to a substantially impalpable powder; substantially as described.

In testimony whereof I affix my signature in presence of two witnesses.

WILLIAM B. CHISOLM.

Witnesses:
J. F. McGRATH,
JOHN D. MULLER.